(12) United States Patent
Yamamoto et al.

(10) Patent No.: US 8,949,319 B2
(45) Date of Patent: *Feb. 3, 2015

(54) TRANSFER DEVICE

(75) Inventors: Masaaki Yamamoto, Kanagawa (JP);
Katsumi Sekiguchi, Kanagawa (JP);
Masaharu Nakatsuchi, Kanagawa (JP);
Norihito Sekizaki, Kanagawa (JP)

(73) Assignee: NTT DOCOMO, INC., Tokyo (JP)

(*) Notice: Subject to any disclaimer, the term of this patent is extended or adjusted under 35 U.S.C. 154(b) by 118 days.

This patent is subject to a terminal disclaimer.

(21) Appl. No.: 13/554,645

(22) Filed: Jul. 20, 2012

(65) Prior Publication Data

US 2012/0284179 A1 Nov. 8, 2012

Related U.S. Application Data

(63) Continuation of application No. 13/010,347, filed on Jan. 11, 2011, now Pat. No. 8,260,878, which is a continuation of application No. 11/006,195, filed on Dec. 6, 2004, now Pat. No. 8,326,940, which is a continuation of application No. 09/508,496, filed as application No. PCT/JP99/04636 on Aug. 27, 1999, now abandoned.

(30) Foreign Application Priority Data

Aug. 27, 1998 (JP) .................................. 10-242318

(51) Int. Cl.
*G06F 15/16* (2006.01)
*G06F 15/173* (2006.01)
(Continued)

(52) U.S. Cl.
CPC ............ *H04L 12/1859* (2013.01); *H04L 12/24* (2013.01); *H04L 29/06* (2013.01);
(Continued)

(58) Field of Classification Search
USPC .................. 709/201–207, 218, 232, 238, 244;
455/415, 417, 412.1, 412.2, 426.1, 455/435.1
See application file for complete search history.

(56) References Cited

U.S. PATENT DOCUMENTS 4,812,843 A 3/1989 Champion, III et al.
5,247,575 A 9/1993 Sprague et al.
(Continued)

FOREIGN PATENT DOCUMENTS

CN 1155199 A 7/1997
EP 0753949 A1 1/1997
(Continued)

OTHER PUBLICATIONS

Ando, Kazumasa, "By using a push software, we were able to construct a system that delivers real-time information within a short period of time at low cost." Nikkei Communications, Jun. 1998, pp. 131-138.

(Continued)

*Primary Examiner* — Shirley Zhang
(74) *Attorney, Agent, or Firm* — Brinks Gilson & Lione

(57) ABSTRACT

The user of a mobile station which is prepared to receive information providing services from unspecified IP (Information Providers) accesses a gateway server and performs a pre-registration procedure (S71). When an IP server has information to provide to users, it constructs the information in the form of electronic mail, appends user attribute data, and sends this to the gateway server (S72). Upon receiving electronic mail with attribute data, the gateway server stores the electronic mail in a third mailbox, makes a comparison of the user attributes, and calls the mobile stations of relevant users (S73). A user who has received a call requests a download of the electronic mail from the gateway server (S74). The gateway server sends electronic mail to the mobile station which made the request (S75, S76).

27 Claims, 9 Drawing Sheets

(51) Int. Cl.
*H04M 3/32* (2006.01)
*H04L 12/18* (2006.01)
*H04L 12/24* (2006.01)
*H04L 29/06* (2006.01)
*H04L 29/08* (2006.01)
*H04L 12/58* (2006.01)

(52) U.S. Cl.
CPC ............ *H04L 41/00* (2013.01); *H04L 67/303* (2013.01); *H04L 67/306* (2013.01); *H04L 67/26* (2013.01); *H04L 67/2814* (2013.01); *H04L 67/14* (2013.01); *H04L 67/04* (2013.01); *H04L 67/2842* (2013.01); *H04L 67/28* (2013.01); *H04L 51/06* (2013.01); *H04L 51/22* (2013.01); *H04L 51/38* (2013.01); *H04L 12/1836* (2013.01); *H04L 67/2847* (2013.01); *H04L 67/2823* (2013.01); *H04L 67/2838* (2013.01); *H04L 69/329* (2013.01)
USPC .......................................................... 709/203

(56) References Cited

U.S. PATENT DOCUMENTS

| | | | |
|---|---|---|---|
| 5,428,778 | A | 6/1995 | Brookes |
| 5,508,817 | A | 4/1996 | Kunigami |
| 5,712,907 | A | 1/1998 | Wegner et al. |
| 5,742,668 | A * | 4/1998 | Pepe et al. ............. 455/415 |
| 5,745,884 | A | 4/1998 | Carnegie et al. |
| 5,781,911 | A | 7/1998 | Young et al. |
| 5,790,785 | A | 8/1998 | Klug et al. |
| 5,794,221 | A | 8/1998 | Egendorf |
| 5,862,325 | A | 1/1999 | Reed et al. |
| 5,870,030 | A | 2/1999 | DeLuca et al. |
| 5,926,624 | A | 7/1999 | Katz et al. |
| 5,937,161 | A | 8/1999 | Mulligan et al. |
| 5,987,454 | A | 11/1999 | Hobbs |
| 6,035,281 | A * | 3/2000 | Crosskey et al. ......... 705/14.69 |
| 6,044,205 | A | 3/2000 | Reed et al. |
| 6,047,310 | A | 4/2000 | Kamakura et al. |
| 6,055,510 | A | 4/2000 | Henrick et al. |
| 6,092,121 | A | 7/2000 | Bennett et al. |
| 6,104,798 | A | 8/2000 | Lickiss et al. |
| 6,119,109 | A | 9/2000 | Muratani et al. |
| 6,185,430 | B1 | 2/2001 | Yee et al. |
| 6,192,407 | B1 | 2/2001 | Smith et al. |
| 6,253,193 | B1 | 6/2001 | Ginter et al. |
| 6,260,027 | B1 | 7/2001 | Takahashi et al. |
| 6,266,699 | B1 | 7/2001 | Sevcik |
| 6,286,039 | B1 | 9/2001 | Van Horne et al. |
| 6,289,382 | B1 | 9/2001 | Bowman-Amuah |
| 6,292,789 | B1 | 9/2001 | Schutzer |
| 6,353,929 | B1 | 3/2002 | Houston |
| 6,421,707 | B1 | 7/2002 | Miller et al. |
| 6,430,409 | B1 | 8/2002 | Rossmann |
| 6,442,571 | B1 | 8/2002 | Haff et al. |
| 6,442,588 | B1 | 8/2002 | Clark et al. |
| 6,455,052 | B1 | 9/2002 | Marcussen et al. |
| 6,463,464 | B1 | 10/2002 | Lazaridis et al. |
| 6,473,622 | B1 | 10/2002 | Meuronen |
| 6,549,612 | B2 | 4/2003 | Gifford et al. |
| 6,567,850 | B1 | 5/2003 | Freishtat et al. |
| 6,591,245 | B1 | 7/2003 | Klug |
| 7,010,306 | B1 | 3/2006 | Tanibayashi et al. |
| 7,142,528 | B2 | 11/2006 | Tanimoto et al. |
| 7,181,417 | B1 | 2/2007 | Langseth et al. |
| 7,200,633 | B2 | 4/2007 | Sekiguchi et al. |
| 7,437,416 | B2 | 10/2008 | Enatsu et al. |
| 2001/0030624 | A1 | 10/2001 | Schwoegler |
| 2005/0102205 | A1 | 5/2005 | Yamamoto et al. |
| 2005/0102422 | A1 | 5/2005 | Yamamoto et al. |
| 2008/0109531 | A1 | 5/2008 | Jenkins |
| 2008/0242363 | A1 | 10/2008 | Onda et al. |
| 2010/0228654 | A1 | 9/2010 | Yamamoto et al. |

FOREIGN PATENT DOCUMENTS

| | | | |
|---|---|---|---|
| EP | 0766431 | A2 | 4/1997 |
| EP | 0777394 | A1 | 6/1997 |
| EP | 0779759 | A2 | 6/1997 |
| EP | 0798889 | A2 | 10/1997 |
| EP | 0798899 | A1 | 10/1997 |
| EP | 1026853 | B1 | 12/2007 |
| JP | 63-299453 | A | 12/1988 |
| JP | 64-048553 | A | 2/1989 |
| JP | 60-065641 | A | 4/1989 |
| JP | 02-058451 | A | 2/1990 |
| JP | 02-131049 | A | 5/1990 |
| JP | 04-079445 | A | 3/1992 |
| JP | 04-361444 | A | 12/1992 |
| JP | 05-014406 | A | 1/1993 |
| JP | 05-268216 | A | 5/1993 |
| JP | 05-207029 | A | 8/1993 |
| JP | 05-244166 | A | 9/1993 |
| JP | 06-152643 | A | 5/1994 |
| JP | 06-224901 | A | 8/1994 |
| JP | 06-250950 | A | 9/1994 |
| JP | 07-107200 | A | 4/1995 |
| JP | 07-162666 | A | 6/1995 |
| JP | 07-212395 | A | 8/1995 |
| JP | 08-097853 | A | 4/1996 |
| JP | 08-167916 | A | 6/1996 |
| JP | 08-180022 | A | 7/1996 |
| JP | 09-018850 | A | 1/1997 |
| JP | 09-046369 | A | 2/1997 |
| JP | 09-091358 | A | 4/1997 |
| JP | 09-214546 | A | 8/1997 |
| JP | 09-214642 | A | 8/1997 |
| JP | 09-284427 | A | 10/1997 |
| JP | 09-288625 | A | 11/1997 |
| JP | 10-013460 | A | 1/1998 |
| JP | 10-032639 | A | 2/1998 |
| JP | 10-107835 | A | 4/1998 |
| JP | 10-117211 | A | 5/1998 |
| JP | 10-161949 | A | 6/1998 |
| JP | 11-066182 | A | 3/1999 |
| WO | WO 97/10558 | A1 | 3/1997 |
| WO | WO 97/20442 | A1 | 5/1997 |
| WO | WO 97/27546 | A1 | 7/1997 |
| WO | WO 97/39532 | A2 | 10/1997 |
| WO | WO 98/00787 | A1 | 1/1998 |
| WO | WO 98/10382 | A1 | 3/1998 |
| WO | WO 98/56202 | A2 | 12/1998 |

OTHER PUBLICATIONS

Hofmann, P.: ROffler, D.; Rebensburg, M. "INGate: Integrating Telephony and Internet"; Proceedings, IEEE Conference on Protocols for Multimedia Systems, Multimedia Networking; 1997; pp. 261-264.

Hyoronsha, Gijutsu, "Software Design", Tokyo; Nov. 18, 1997, pp. 82-85.

Irukayama, Goto, "Reinstatement of Pagers and Short Message Service Users", Business Personal Computing Age, Jul. 1998, pp. 81-86.

Ishii, Kazuya, "The Newest Trend of the Internet! Let's Arm Ourselves by Using Push-Technology in the Information World," Internet Magazine, No. 31, Impress Co., Aug. 1, 1997, pp. 278-289.

"Let's Step Up From Being a Novice Net Surfer! 34 Keys for Using the Internet 256 Times As Much As Now," ASCII vol. 21, No. 11, ASCII Co., Nov. 1, 1997, pp. 228-301.

Rothstein, Edward, "Making the Internet Come to You, Through 'Push' Technology;" Jan. 20, 1997, Monday, Late Edition—Final; The New York Times; Section D, p. 5, col. 1; Business Financial Desk.

Shido, Masahiro, "Push Technology for Solving an Information Flood Problem," Nikkei Computer, No. 414, Nikkei Business Publications, Inc., Mar. 31, 1997, pp. 216-223.

Tso, Michael M., et al., "Always on, Always Connected Mobile Computing," *Fifth IEEE International Conference on Universal Personal Communications*, Sep. 29-Oct. 2, 1996, Cambridge, MA, U.S.A., pp. 918-924.

Udell, John, "Internet Project of BYTE No. 15, Hybrid of e-mail and Web System," Nikkei BITE, vol. 157, Nikkei Business Publications, Inc., Oct. 22, 1996, pp. 265-270.

(56) References Cited

OTHER PUBLICATIONS

Yasui, Isamu, "E-mails Attract Potential Clients. They are so powerful as to have a response rate of 50%," Nikkei Multimedia, vol. 29, Nikkei Business Publications, Inc., Nov. 15, 1997, pp. 66-76.

Extended European Search Report for European Application No. 06002937.8, dated Jun. 23, 2006, 6 pages.

Extended European Search Report for European Application No. 06002938.6, dated Dec. 6, 2006, 7 pages.

Extended European Search Report for European Application No. 06002936.0, dated Dec. 6, 2006, 8 pages.

Extended European Search Report for counterpart European Application No. 09166260.1, dated May 16, 2011, 10 pages.

Official Communication from the European Patent Office for European Application No. 06002938.6, dated Feb. 15, 2008, 3 pages.

Official Communication from the European Patent Office for European Application No. 03010047.3, dated Apr. 29, 2009, 13 pages.

Office Action from Japanese Application No. 2004-280102, dated Dec. 19, 2006, 4 pages (with translation).

Office Action from the Patent Office of the Polish Republic, Patent Examination Department, Invention No. P-339954/DP, dated Feb. 15, 2007, 4 pages (with translation).

Office Action from Norwegian Application No. 20001761, dated Nov. 19, 2007, 4 pages (with translation).

Office Action from the Norwegian Patent Office, Invention No. 20001762, dated Nov. 27, 2007, 7 pages (with translation).

Office Action from the Malaysian Patent Office for Malaysian Application No. PI-20050887, dated May 13, 2008, 3 pages.

Office Action from the Malaysian Patent Office for Malaysian Application No. PI-20050641, dated Feb. 20, 2009, 27 pages.

Office Action from Chinese Application No. 2006101005968, date unknown, 7 pages.

Office Action from Chinese Application No. 2006101005987, dated Apr. 4, 2008, 19 pages (with translation).

Office Action from Chinese Application No. 2006101005987, dated Dec. 12, 2008, 12 pages (with translation).

Office Action from Chinese Application No. 2006101005987, dated May 22, 2009, 20 pages (with translation).

Decision of Rejection for Chinese Application No. 200310118253.0, dated Oct. 23, 2009, 9 pages (with translation).

Office Action from U.S. Appl. No. 09/508,496, dated Jan. 2, 2003, 10 pages.

Office Action from U.S. Appl. No. 09/508,496, dated Oct. 3, 2003, 35 pages.

Office Action from U.S. Appl. No. 09/508,496, dated Jul. 6, 2004, 34 pages.

Office Action from U.S. Appl. No. 11/006,195, dated May 8, 2008, 22 pages.

Office Action from U.S. Appl. No. 11/006,195, dated Jan. 26, 2009, 26 pages.

Office Action from U.S. Appl. No. 11/006,195, dated Jun. 8, 2009, 28 pages.

Office Action from U.S. Appl. No. 11/006,195, dated Oct. 14, 2009, 28 pages.

Office Action from U.S. Appl. No. 11/006,195, dated Mar. 12, 2010, 29 pages.

Office Action from U.S. Appl. No. 11/006,195, dated Dec. 21, 2010, 29 pages.

Office Action from U.S. Appl. No. 13/010,347, dated Apr. 18, 2011, 20 pages.

Office Action from U.S. Appl. No. 11/006,195, dated Jun. 7, 2011, 36 pages.

Office Action from U.S. Appl. No. 11/006,195, dated Oct. 20, 2011, 29 pages.

Office Action from U.S. Appl. No. 13/010,347, dated Nov. 14, 2011, 25 pages.

Office Action from U.S. Appl. No. 13/010,347, dated Feb. 27, 2012, 25 pages.

Notice of Allowance from U.S. Appl. No. 13/010,347, dated May 4, 2012, 10 pages.

Notice of Allowance from U.S. Appl. No. 11/006,195, dated May 24, 2012, 7 pages.

Notice of Allowance from U.S. Appl. No. 11/006,195, dated Sep. 12, 2012, 6 pages.

Office Action from U.S. Appl. No. 13/554,626, dated Oct. 3, 2012, 17 pages.

Notice of Allowance for co-pending U.S. Appl. No. 13/554,626, dated Feb. 11, 2013, 5 pages.

* cited by examiner

FIG. 2

SUBSCRIBER REGISTRATION INFORMATION FILE

| TELEPHONE NUMBER | NAME | SEX | BIRTHDATE | ADDRESS |
|---|---|---|---|---|
| ..... | ..... | ... | ..... | ....... |
| ..... | ..... | ... | ..... | ....... |
| ..... | ..... | ... | ..... | ....... |
| ..... | ..... | ... | ..... | ....... |
| ..... | ..... | ... | ..... | ....... |

IP REGISTRATION INFORMATION FILE

| COMPANY NAME | URL | IP BILLING/USER BILLING | AMOUNT-DEPENDENT/FIXED-RATE |
|---|---|---|---|
| ..... | ..... | ........ | ........ |
| ..... | ..... | ........ | ........ |
| ..... | ..... | ........ | ........ |
| ..... | ..... | ........ | ........ |

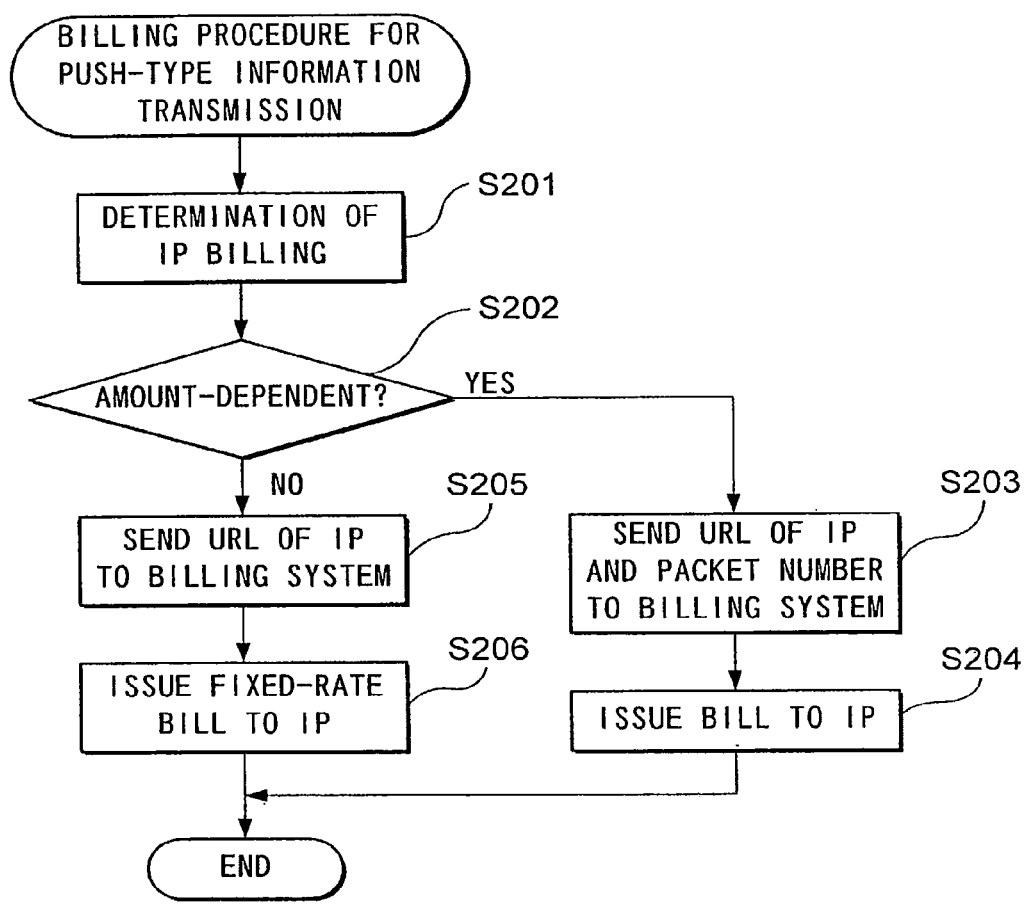
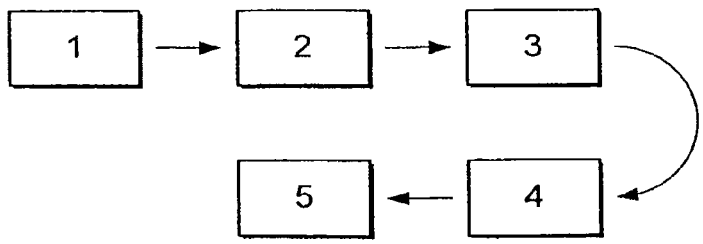
1~5: SEQUENCE OF DIALOG SCREENS DISPLAYED WHEN USER PERFORMS REGISTRATION PROCEDURES
4: REGISTRATION SCREEN PROVIDED BY GATEWAY SERVER

TRANSFER DEVICE

RELATED APPLICATIONS

This application is a continuation of U.S. patent application Ser. No. 13/010,347 filed on Jan. 11, 2011, now U.S. Pat. No. 8,260,878 which is a continuation of U.S. patent application Ser. No. 11/006,195 filed on Dec. 6, 2004, now U.S. Pat. No. 8,326,940 which is a continuation of U.S. patent application Ser. No. 09/508,496 filed on Mar. 8, 2000, now abandoned which is a 371 national phase application of PCT/JP99/04636 filed on Aug. 27, 1999 which claims priority to Japanese Patent Application No. 10/242318 filed on Aug. 27, 1998. The entire contents of these applications are incorporated herein by reference.

TECHNICAL FIELD

The present invention relates to a push-type information transmission method which provides information from a server device to a plurality of user terminals via a network, and a transfer device thereof.

BACKGROUND ART

Pull-type information transmission wherein a user accesses a server device of an information provider from a communication terminal such as a personal computer or the like to download desired information has been known conventionally in the field of information providing services which use the Internet.

Additionally, push-type information transmission wherein information is provided to the user from the server side without awaiting access by a user has been proposed in recent years.

Communication networks have become more complicated and diversified of late, so that the forms of networks in which various routers exist between the server device and the user terminal such as by interposing a gateway device between networks with different protocols have also increased.

DISCLOSURE OF THE INVENTION

As the forms of networks continue to diversify as discussed above, various forms of information transmission services will become possible. As one example, it is possible to supplement a portion of the services involved in information transmission with a gateway unit instead of server device.

The present invention was made in view of these considerations, and has the purpose of offering a new form of push-type information transmission method and transfer device thereof, capable of supplementing a part of the services involved in information transmission between a server device and a user terminal instead of the server device.

In order to resolve the above problems, a first aspect of the present invention is a push-type information transmission method in an communication network including an information provider server device, a plurality of user terminals for receiving information provided by the server device, and a transfer device for routing information transmission between the server device and the user terminal; wherein the transfer device comprises:

a step of receiving information mail supplied with a network address of a user terminal designated as a desired destination from the server device;

a step of storing the information mail;

a step of calling the user terminal whose network address has been designated; and a step of transmitting the stored information mail in response to a request from the called user terminal.

Additionally, in the above-described first aspect of the present invention, the user terminal may comprise a step of pre-accessing the server device and registering its own network address with the server device as a registration procedure for receiving an information transmission service offered by the server device, and the server device provides information to user terminals which have completed the registration.

Additionally, a second aspect of the present invention is a push-type information transmission method in an communication network including an information provider server device, a plurality of user terminals for receiving information provided by the server device, and a transfer device for routing information transmission between the server device and the user terminal; wherein the transfer device comprises:

a step of pre-storing information relating to user terminals which are to receive an information providing service offered by the server device;

a step of receiving information mail supplied from the server device;

a step of storing the information mail;

a step of calling a relevant user terminal based on the pre-stored information relating to user terminals which are to receive an information providing service; and a step of transmitting the stored information mail in response to a request from the called user terminal.

Additionally, in the above-described second aspect of the present invention, the user terminal may comprise a step of pre-accessing the server device and registering its own network address with the server device as a registration procedure for receiving an information transmission service offered by the server device, such that due to this step, information relating to the user terminals which are to receive information providing services offered by the server device is pre-stored.

Additionally, a third aspect of the present invention is a push-type information transmission method in an communication network including an information provider server device, a plurality of user terminals for receiving information provided by the server device, and a transfer device for routing information transmission between the server device and the user terminal; wherein the transfer device comprises:

a step of storing user attribute data of each user and network addresses of the user terminals in correspondence;

a step of receiving information mail supplied from the server device together with attribute information of users designated as desired destinations;

a step of storing the received information mail;

a step of comparing the stored user attribute data and the designated user attribute data, and specifying network addresses of user terminals corresponding to users having the designated attributes;

a step of calling the specified user terminals; and a step of sending the stored information mail in response to a request from the called user terminals.

Additionally, in the above-mentioned third aspect of the present invention, the user terminal may comprise a step of pre-accessing the server device and registering its own network address with the server device as a registration procedure for receiving an information transmission service offered by the server device, the transfer device calling up user terminals which have completed the registration.

Additionally, a fourth aspect of the present invention is a transfer device for routing information transmissions between an information provider server device and a plurality of user terminals for receiving the information provided by the server device, comprising:

receiver for receiving information mail supplied from the server device together with a network address of a user terminal designated as a desired destination;

storage means for storing the received information mail;

calling means for calling the user terminal whose network address has been designated; and transmitter for transmitting the stored information mail in response to requests from the called user terminal.

Additionally, a fifth aspect of the present invention is a transfer device for routing information transmissions between an information provider server device and a plurality of user terminals for receiving the information provided by the server device, comprising:

memory for pre-recording information relating to a user terminal which is to receive an information providing service offered by the sever device;

receiver for receiving information mail supplied from the server device;

storage means for storing the received information mail;

calling means for calling relevant user terminals based on information relating to the pre-recorded user terminal which is to receive an information providing service; and transmitter for transmitting the stored information mail in response to requests from the called user terminal.

Additionally, a sixth aspect of the present invention is a transfer device for routing information transmissions between an information provider server device and a plurality of user terminals for receiving the information provided by the server device, comprising:

memory for recording user attribute information and a network address of the user terminal in correspondence with each other with respect to each user;

receiver for receiving from the server device information mail supplied together with attribute information of a user designated as a desired destination;

storage means for storing the received information mail;

specifying means for comparing the recorded user attribute information with the designated user attribute information, and specifying network addresses of user terminals which correspond to user having the designated attributes;

calling means for calling the specified user terminals; and transmitter for transmitting the stored information mail in response to requests from the called user terminals.

Additionally, in the present invention, the server device may belong to a first communication network which follows a first communication protocol, and the plurality of user terminals may belong to a second communication network which follows a second communication protocol different from that of the first communication network; and the transfer device may be a gateway for converting between the first and second protocols and routing the exchange of information mails.

Additionally, in the present invention, the plurality of user terminals may be given first network addresses used only on the first communication network and are discriminated on the first communication network by second network addresses which have a one-to-one correspondence with the first network addresses in the second communication network; and the transfer device may be such as to convert between addresses in the first network and addresses in the second network.

Additionally, in the present invention, the second communication network may be a local network accommodating specific user terminals; and the first communication network may be a global network interconnecting information resources such as the server device to which are allotted identification information for identifying an absolute address in the network.

Additionally, in the present invention, the second communication network may be a mobile communication network accommodating a plurality of user terminals which are mobile terminals; and the first communication network may be the Internet.

BRIEF DESCRIPTION OF THE DRAWINGS

FIG. 2 is a data format diagram showing the contents of a subscriber database according to the same embodiment.

FIG. 9 is a flow chart showing a billing procedure for the case of the same push-type information transmission.

FIG. 10 is a screen transition diagram for explaining a variant of the present invention.

BEST MODES FOR CARRYING OUT THE INVENTION

Herebelow, an embodiment of the present invention shall be explained with reference to the drawings. This embodiment is structured as a system wherein the present invention is applied to a mobile packet communication network. The present invention is not restricted to the following embodiment, and various modifications are possible within the range of the technical concept thereof.

A: Structure of Embodiment (1) Overall Structure of System

Figure 1:
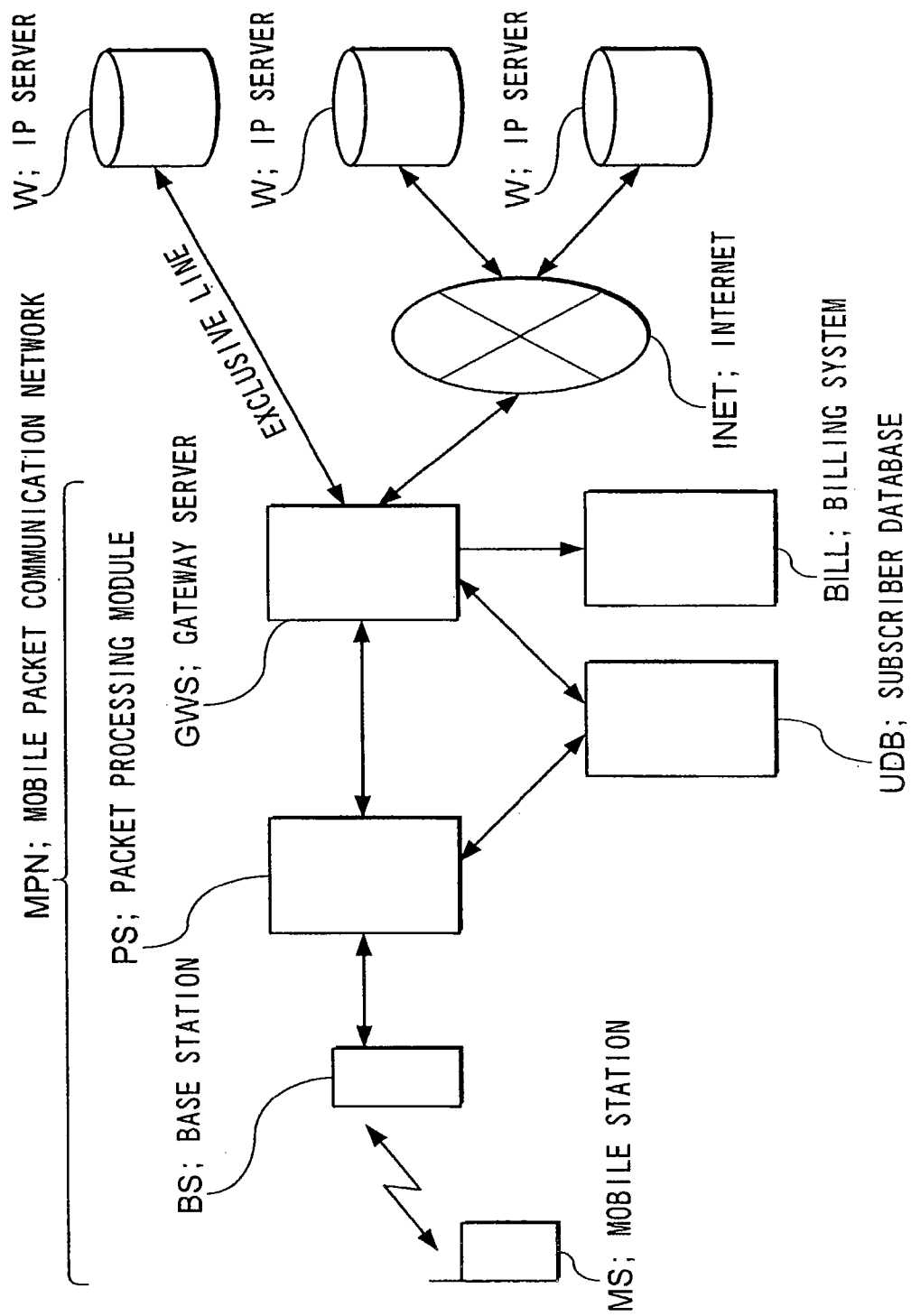
FIG. 1 is a block diagram showing the overall structure of a system according to an embodiment of the present invention.

FIG. 1 is a block diagram showing an embodiment of the present invention.

In the drawing, MS denotes a mobile station which receives packet communication services from a mobile packet communication network MPN. This mobile station MS is connected not only to the mobile packet communication network MPN shown in the drawing, but also to a mobile telephone network which is not shown, and is therefore capable of receiving mobile telephone services as well. The mobile station MS comprises an voice input-output portion for a user to perform voice communications, a radio portion for performing radio communications with a base station BS, an information display portion comprising a liquid crystal panel or the like and an operating portion where information input operations such as number input and character input are performed, and also has an internal microcomputer for controlling these parts. Additionally, the mobile station MS has software (i.e. a browser) for browsing HTML (Hyper Text Markup Language) document data (hereinafter referred to as HTML data), and displays an interactive screen for the user based on HTML data supplied from an information provider (hereinafter abbreviated to IP) via a mobile packet communication network.

Additionally, the mobile packet communication network MPN comprises a base station BS, a packet processing module PS, a gateway server GWS, a subscriber database UDB, a billing system BILL and a communication line for connecting these elements.

The base stations BS are positioned at predetermined intervals obtained by dividing the ground into ranges of e.g. a radius of 500 m, and perform radio communications with mobile stations MS visiting the radio zones formed thereby.

The packet processing module PS is a computer system provided in a packet switching center accommodating a plurality of base stations BS, which receives packet switching requests from the mobile stations MS (packet switching service registration to be explained below), and performs the switching of packets in the mobile packet communication network.

The gateway server GWS is a computer system provided in a mobile packet gateway switching center for interconnecting the mobile packet communication network MPN with other networks such as the Internet INET, which converts communication protocols which differ between the networks. Specifically, conversions are made between the transmission protocol for mobile packet communications networks used by the mobile packet communication network MPN and the TCP/IP used in other networks such as the Internet INET. Additionally, the gateway server GWS works in cooperation with the IP server W, the subscriber database UDB and the billing system BILL to perform control relating to the various applications, such as information providing services and billing procedures for information transmission.

The subscriber database UDB stores a subscriber registration information file composed of information relating to subscribers of the mobile packet communication network MPN and an IP registration information file composed of registration information of the IP (Information Provider). FIG. 2 is a data format diagram showing an example of the content of this subscriber database UDB. As shown in the drawing, the subscriber registration information file contains attribute data indicating the attributes of each subscriber such as the telephone number of the mobile station MS, name, sex, birthdate and address for each subscriber (i.e. the user of the mobile station MS) in the mobile packet communication network MPN. Additionally, the IP registration information file contains the company name and the absolute address on the network (e.g. in the case of the Internet, the URL (Uniform Resource Locator) which specifies the information resources on the WWW (World Wide Web); herebelow, the absolute network address in the present embodiment shall be referred to as the URL), information indicating whether the type of billing is IP billing or not, and information indicating whether the type of billing depends on the amount or is fixed-rate, for each IP which is contracted to receive gateway services with the company which runs this mobile packet communication network MPN. Here, IP billing refers to billing for information transmissions service which is performed not with respect to the user who received the transmission service, but with respect to the information provider. On the other hand, billing with respect to the user shall hereinafter be referred to as user billing.

The billing system BILL calculates the fees for the providing of services based on service history information supplied from the gateway server, and issues a bill to the user or the IP. While billing types include user billing and IP billing as well as amount-dependent and fixed-rate, the billing system BILL performs billing in accordance with each billing type.

The IP server W is a server system run by the IP, which sends information to be provided to the users over a network in an HTML data format. The IP server W can be connected to the gateway server GWS via an exclusive line or the Internet INET, can be provided inside the gateway server GWS which is provided by the owner of the mobile packet communication network MPN (hereafter referred to as an IP server W-MAX).

(2) Structure of Gateway Server

Figure 3:
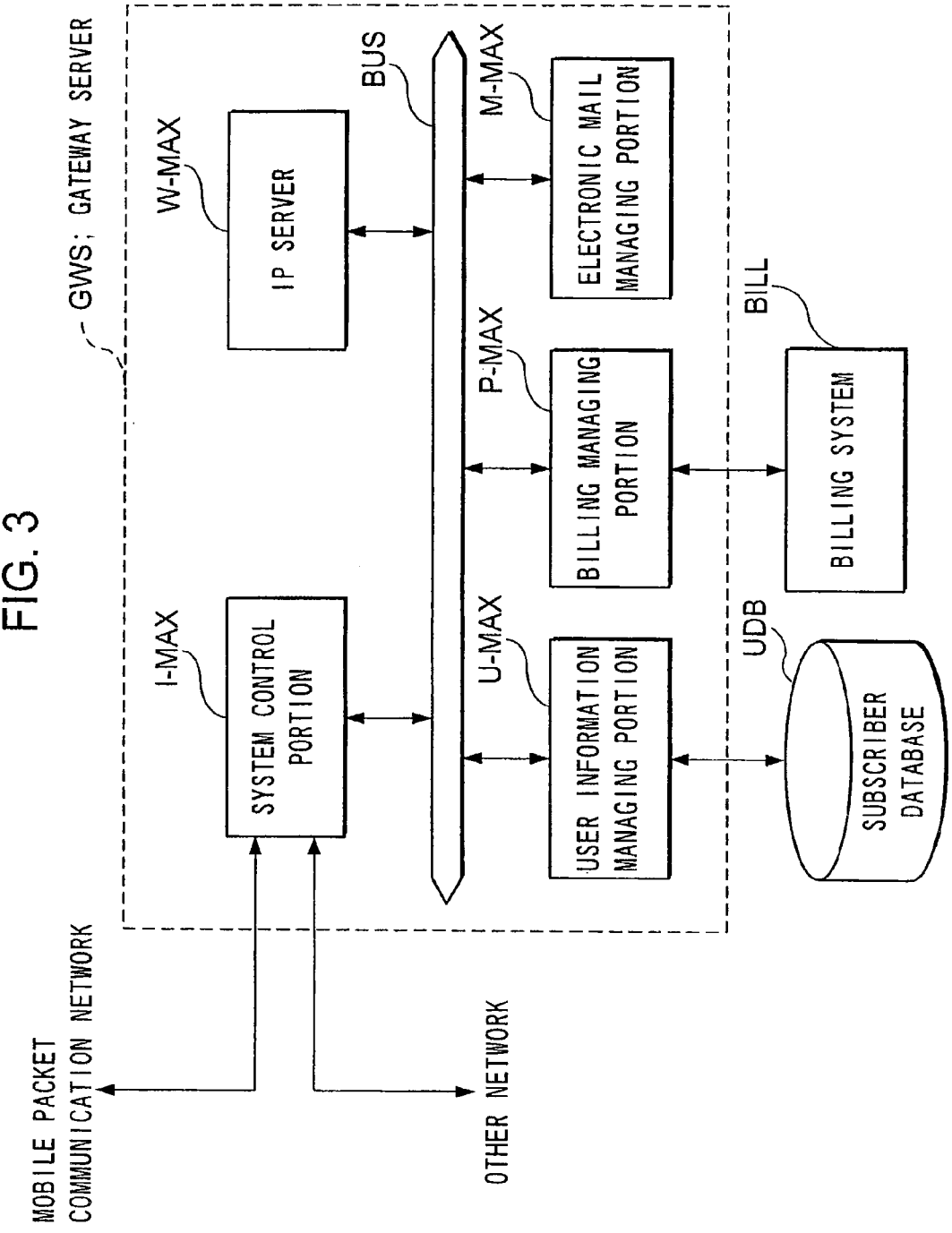
FIG. 3 is a block diagram showing the structure of a gateway server according to the same embodiment.

Next, the structure of the gateway server GWS shall be explained. FIG. 3 is a block diagram showing the structure of a gateway server GWS. In the drawing, the gateway server GWS comprises a system control portion I-MAX, a user information managing portion U-MAX, a billing managing portion P-MAX, an electronic mail managing portion M-MAX, an IP server W-MAX and a bus BUS for connecting these parts.

The system control portion I-MAX controls the various portions of the gateway server GWS, and functions as an interface between networks such as by performing protocol conversion between the mobile packet communication network MPN and other networks such as the Internet INET.

The user information managing portion U-MAX stores and manages subscriber registration information and IP registration information obtained by referencing the subscriber database UDB, as well as the correspondence between telephone numbers of the mobile stations and user management numbers (to be explained below) and the access histories of users to the IP server W (for example, the number of accesses to each IP server). Additionally, the user information managing portion U-MAX performs conversions between the telephone numbers and user management number, collation of telephone numbers and comparison of attribute data based on the above stored information.

The billing managing portion P-MAX records and manages information necessary for billing with respect to the information transmission services, and supplies this information to the billing system BILL. Specifically, it stores the fact that an electronic mail has been received from the IP server W as history information, calculates the number of packets to be exchanged when transmitting the electronic mail to the user, and stores this calculated value. Additionally, the billing managing portion P-Max references the content of the subscriber database UDB transferred to the user information managing portion U-MAX, in order to determine whether or not the billing type for each IP is IP billing, and whether or not it is amount-dependent, then requests billing to the billing system BILL based on the billing type.

The electronic mail managing portion M-MAX mediates the exchange of electronic mail between mobile station MS users, between mobile station MS users and users of other networks such as the Internet INET, or between the mobile station MS users and the IP server W. This electronic mail managing portion M-MAX is provided with mailboxes for storing the electronic mails to be transferred for each user or for each IP server W. There are three types of mailboxes in accordance with the type of mail service, and these being distinguished by the addresses of their mailboxes (mail addresses).

(i) A first mailbox BOX1 is a conventional mailbox wherein the electronic mail transferred between users is stored at mail addresses assigned for each user.

(ii) Next, a second mailbox BOX2 is a mailbox for storing electronic mail transmitted from the IP to specific users for the purposes of providing information or the like. Here, a specific user is a user who has already completed registration procedures with respect to the IP. This second mailbox BOX2 is used in a first type of service due to push-type information transmission to be described below.

(iii) Next, a third mailbox BOX3, as with the second mailbox BOX2, is a mailbox for storing electronic mail transmitted from the IP to a user for the purposes of providing information. It differs from the second mailbox BOX2 in that instead of storing electronic mail provided to users which have been pre-registered in the IP, it stores electronic mail provided to users having attributes (attributes such as sex, age, address, etc.) designated by the IP. This third mailbox BOX3 is used in a second type of service due to push-type information transmission to be described below.

The IP server W-MAX is a server system provided by the company owning the mobile packet communication network MPN. This IP server W-MAX, like the other IP server W, performs services such as providing information to the users.

B. Operations of the Embodiment

Next, operations of the embodiment having the above-described structure shall be explained.

First, information transmission shall be explained, followed by an explanation of the billing procedures.

B-1. Information Transmission

With regard to the information transmission according to the present embodiment, there is pull-type information transmission in which the user of a mobile station MS receives information transmissions by accessing the IP server W, and push-type information transmission in which information transmission is performed from the IP server W side to specified or non-specified users without waiting for user access. Herebelow, the explanation shall be given separately for these types.

(1) Pull-type Information Transmission

Figure 4:
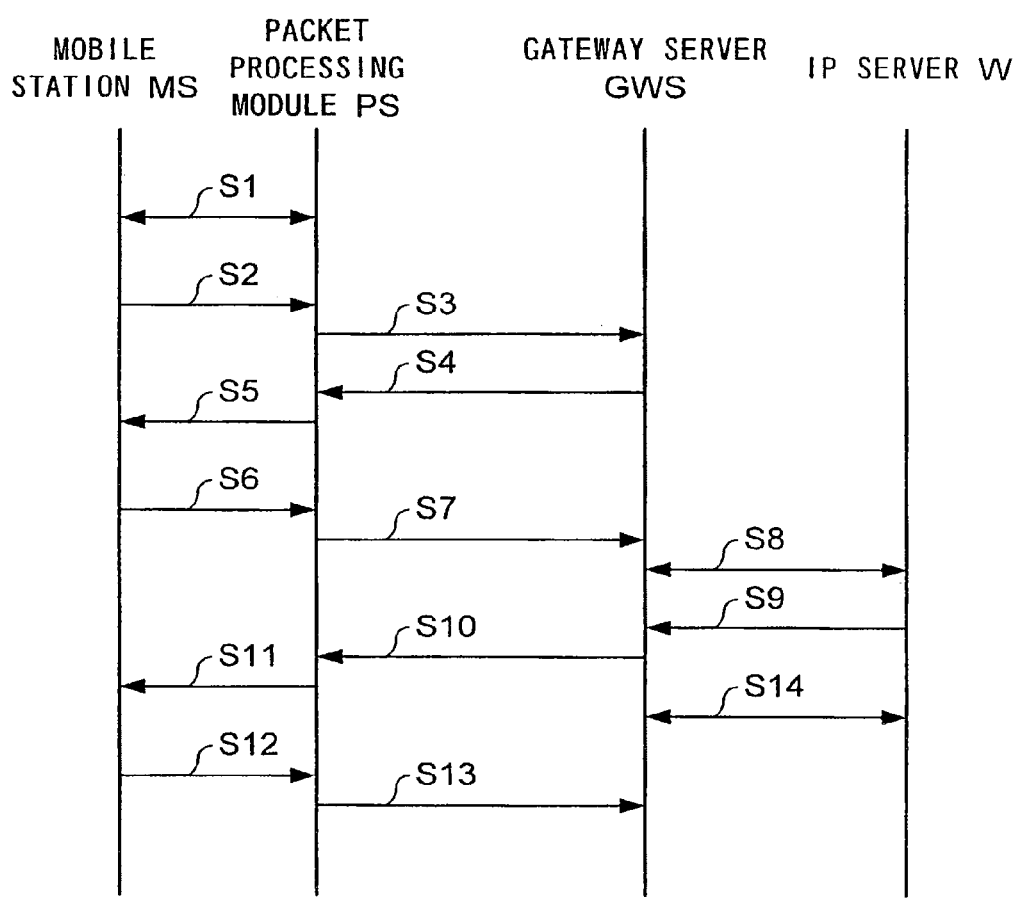
FIG. 4 is a sequence diagram showing the basic operations of pull-type information transmission according to the same embodiment.

FIG. 4 is a sequence showing a basic operation for pull-type information transmission.

As shown in the drawing, the mobile station MS performs a packet switching service registration in cooperation with the packet processing module PS (step S1). The packet switching service registration is a preliminary registration procedure for enabling packet switching in a mobile packet communication network MPS. When this packet switching service registration is completed, the mobile station MS sends a line connection request signal to the mobile packet communication network MPS (step S2). This line connection request signal is sent through the packet processing module PS to the gateway server GWS (step S3). If a line connection is possible, then the gateway server GWS sends a line connection response signal through the packet processing module PS back to the mobile station MS (steps S4, S5). As a result, packet switching becomes possible between the mobile station MS and the gateway server GWS.

Next, the mobile station MS sends a connection request signal designating the URL of a desired IP server W (step S6). This connection request signal is routed through the packet processing module PS and sent to the gateway server GWS (step S7). The gateway server GWS receives the connection request signal, and establishes a link with the IP server W of the designated URL (step S8).

When a link has been established with the gateway server GWS in this way, the IP server W sends HTML data which has been prepared beforehand to the mobile station MS (step S9). This HTML data is routed through the gateway server GWS and transferred to the packet processing module PS (step S10). Furthermore, at the packet processing module PS, the received HTML data is transferred to the mobile station MS (step S11).

The operations of the above steps S6-S11 are repeatedly performed in accordance with the amount of all of the data to be transmitted from the IP server W to the mobile station MS. At this time, the mobile station MS interprets sequentially transmitted HTML data by means of the browser and displays the received information at the information display portion.

When the data transmission to the mobile station MS has been completed, the mobile station MS sends an acknowledgement signal (step S12). The packet processing module PS transfers this acknowledgement signal to the gateway server GWS so as to make a delivery notification (step S13). When the IP server W completes the data transmission to the mobile station MS, the link between the gateway server GWS and the IP server W is released (step S14).

Additionally, when there is a data delivery notification from the mobile station MS to the gateway server GWS, the gateway server GWS performs a billing procedure with respect to the information transmission. The billing procedure performed at this time shall be described in detail below.

(2) Push-type Information Transmission

First, the basic operations of the push-type information transmission shall be explained, followed by explanations of two types of services due to push-type information transmission.

(i) Basic Operations of Push-type Information Transmission

Figure 5:
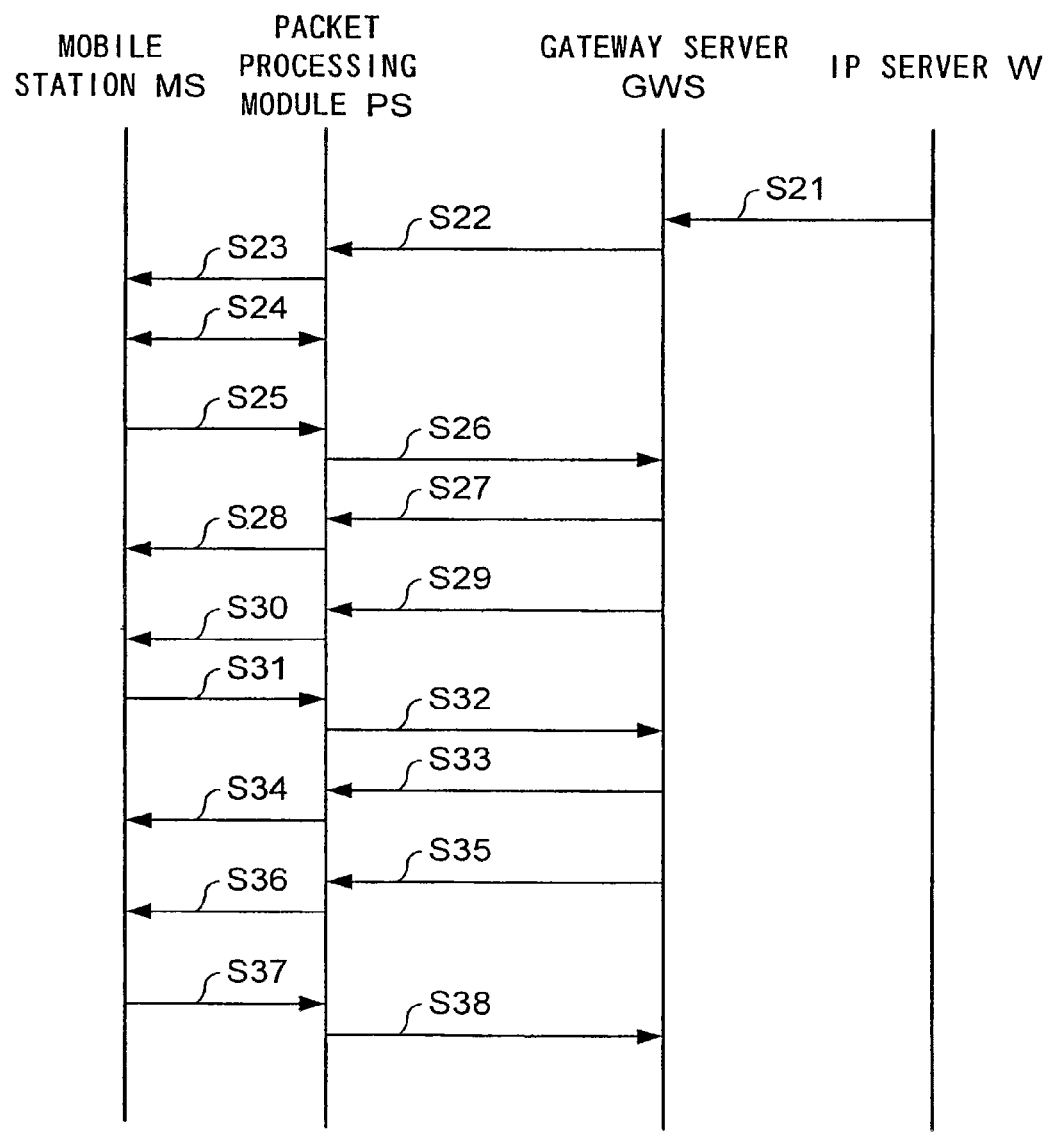
FIG. 5 is a sequence diagram showing the basic operations of push-type information transmission according to the same embodiment.

FIG. 5 is a sequence diagram illustrating the basic operations of push-type information transmission.

In the drawing, an IP server W first sends information to be provided to users to the gateway server GWS in the form of electronic mail (step S21). When the gateway server GWS receives the electronic mail, it stores this in the designated mailbox and sends a communication start notification signal to the packet processing module PS (step S22). This communication start notification signal includes information designating the destination address of the electronic mail. When the packet processing module PS receives this communication start notification signal, it calls the mobile station MS corresponding to the destination address included in the signal (step S23).

When the user of the mobile station MS performs a specified operation on the mobile station MS in response to the call, the same sequence as the above-described steps S1-S5 (shown in FIG. 4) is performed, and it enters a state of being capable of packet switching with the gateway server GWS (steps S24-S28). Next, the gateway server GWS sends a reception notification signal including the address information of the mailbox in which the electronic mail is stored to the packet processing module PS (step S29). Furthermore, the packet processing module PS sends the received reception notification signal to the mobile station MS (step S30).

Upon receiving the above-described reception notification signal, the mobile station MS sends a connection request signal designating the address of the mailbox included in the reception notification signal to the packet processing module PS (step S31). This connection request signal is transferred through the packet processing module PS to the gateway server GWS (step S32). Upon receiving the connection request signal, the gateway server GWS sends a connection acnowledgement signal to the packet processing module PS (step S33). The packet processing module PS sends the received connection acnowledgement signal to the mobile station MS (step S34).

Next, the gateway server GWS reads the electronic mail received from the IP server W from the mailbox whose address is designated in the connection request signal, and transfers the electronic mail to the packet processing module PS (step S35). Upon receiving the electronic mail, the packet processing module PS sends this mail to the mobile station MS which issued the connection request (step S36).

The operations of the above steps S31-S36 are repeatedly performed in accordance with the amount of data in the electronic mail to be transmitted from the IP server W to the mobile station MS.

When the mobile station MS has received the electronic mail in this way, a delivery notification is sent to the gateway server GWS in the same manner as in steps S12 and S13 shown in FIG. 4 (steps S37, S38), and the push-type information transmission is completed.

Additionally, if there is a data delivery notification from the mobile station MS to the gateway server GWS, then the gateway server GWS performs a billing procedure with respect to the information transmission. The billing procedure performed at this time shall be described in detail below.

(ii) First Type of Service by Means of Push-type Information Transmission

In the present embodiment, there are two types of services by means of push-type information transmission. A first type shall now be described.

The first type is a service of transmitting electronic mail from the IP server for the purpose of providing certain information to users who have completed a registration procedure with the IP beforehand, wherein the electronic mail is stored in the second mailbox BOX2, and the electronic mail is transmitted in response to a user request after the user has been called.

Figure 6:
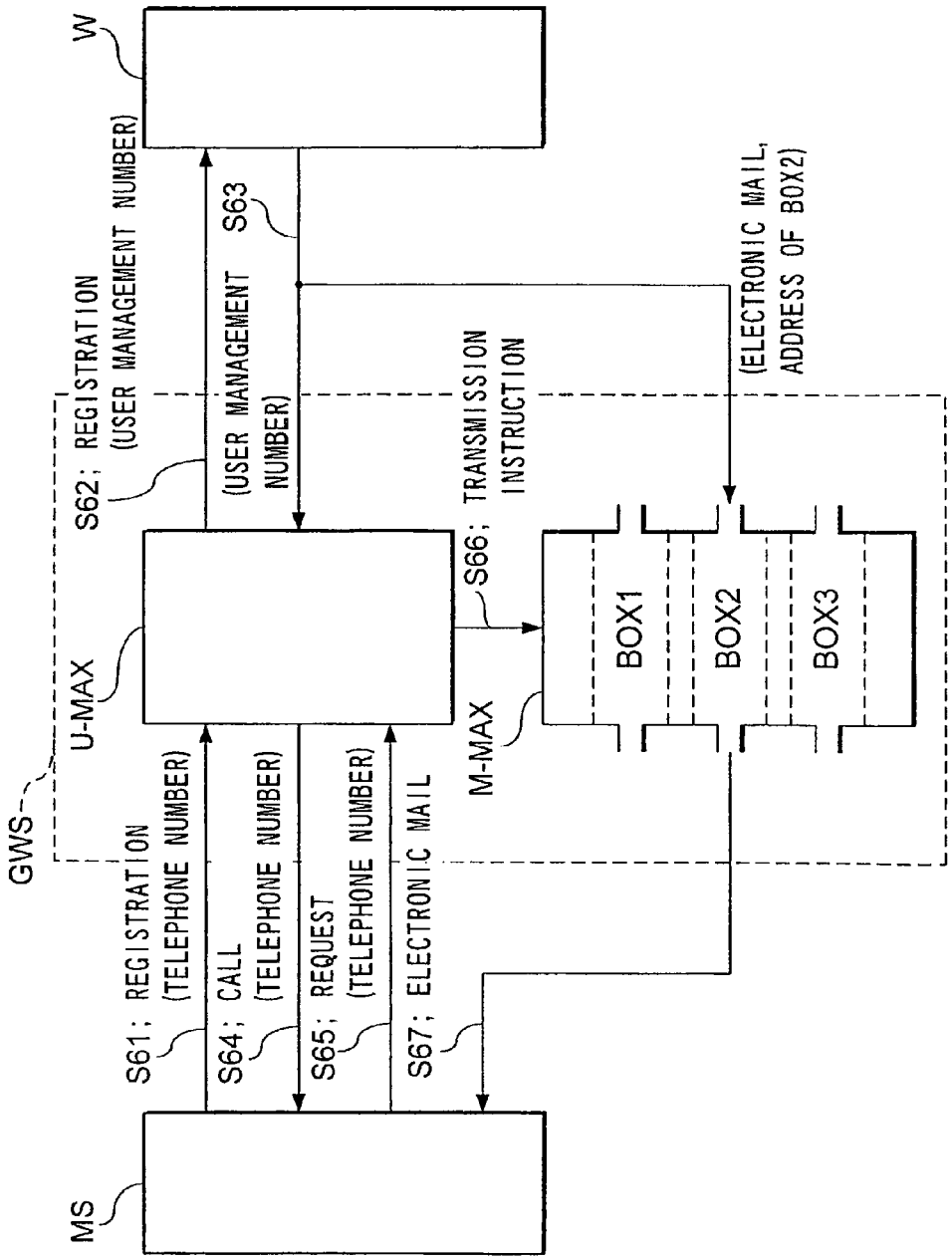
FIG. 6 is a conceptual diagram showing a first embodiment of the services according to the same push-type information transmission.

FIG. 6 is a conceptual diagram for explaining the first type. In this drawing, a user who desires services such as information provision of a specific IP operates a mobile station MS to access the network, and performs preliminary registration procedures with respect to the IP server (step S61). With this access, the subscriber number of the user (i.e. the telephone number of the mobile station MS) is transferred to the gateway server GWS. The gateway server GWS converts the received subscriber number into a user management number which is user identity information having a one-to-one correspondence with the telephone number in the user information managing portion U-MAX in order to avoid the telephone number being sent outside the packet communication network MPN. This user management number is sent from the gateway server GWS to the IP server W, and is stored in the IP server W as user registration information (step S62).

Then, if the IP server W has information to be provided to a registered user, the IP server W arranges the information as transmission data in the form of electronic mail, appends to the electronic mail the address of the second mailbox BOX2 and the user management number of the registered user to which the information is to be provided, and sends the mail to the gateway server GWS (step S63).

When the gateway server GWS receives the electronic mail from the IP server W, it stores the mail in the second mailbox BOX2 of the electronic mail managing portion M-MAX, and converts the designated user management number to the corresponding telephone number in the user information managing portion U-MAX, and calls the mobile station MS of that telephone number (step S64).

If the user of the mobile station MS who has received this call desires to receive the information provided by the IP server, the user operates the mobile station MS to access the gateway server GWS and requests a download of the electronic mail (step S65). The download request signal sent to the gateway server GWS at this time contains the telephone number of the mobile station MS which is the source of the request. The gateway server GWS compares the telephone number of the mobile station MS from which the request signal is originated and the telephone number corresponding to the user management number designated by the IP server W at the time of reception of the electronic mail in the user information managing portion U-MAX, thereby judging whether or not to permit access to the second mailbox BOX2, and thereafter reads the electronic mail from the mailbox BOX2 and sends it to the mobile station MS (steps S66, S67).

In this way, it is possible to provide information to specific users registered with the IP server W.

(iii) Second Type of Service by Means of Push-type Information Transmission

Next, the second type shall be explained. The second type is a service whereby electronic mail sent from the IP server for the purposes of providing information to users having attributes (attributes such as sex, age and address) designated by the IP server is stored in a third mailbox BOX3, and the electronic mail is transmitted to relevant users in response to user requests after they have been called.

Figure 7:
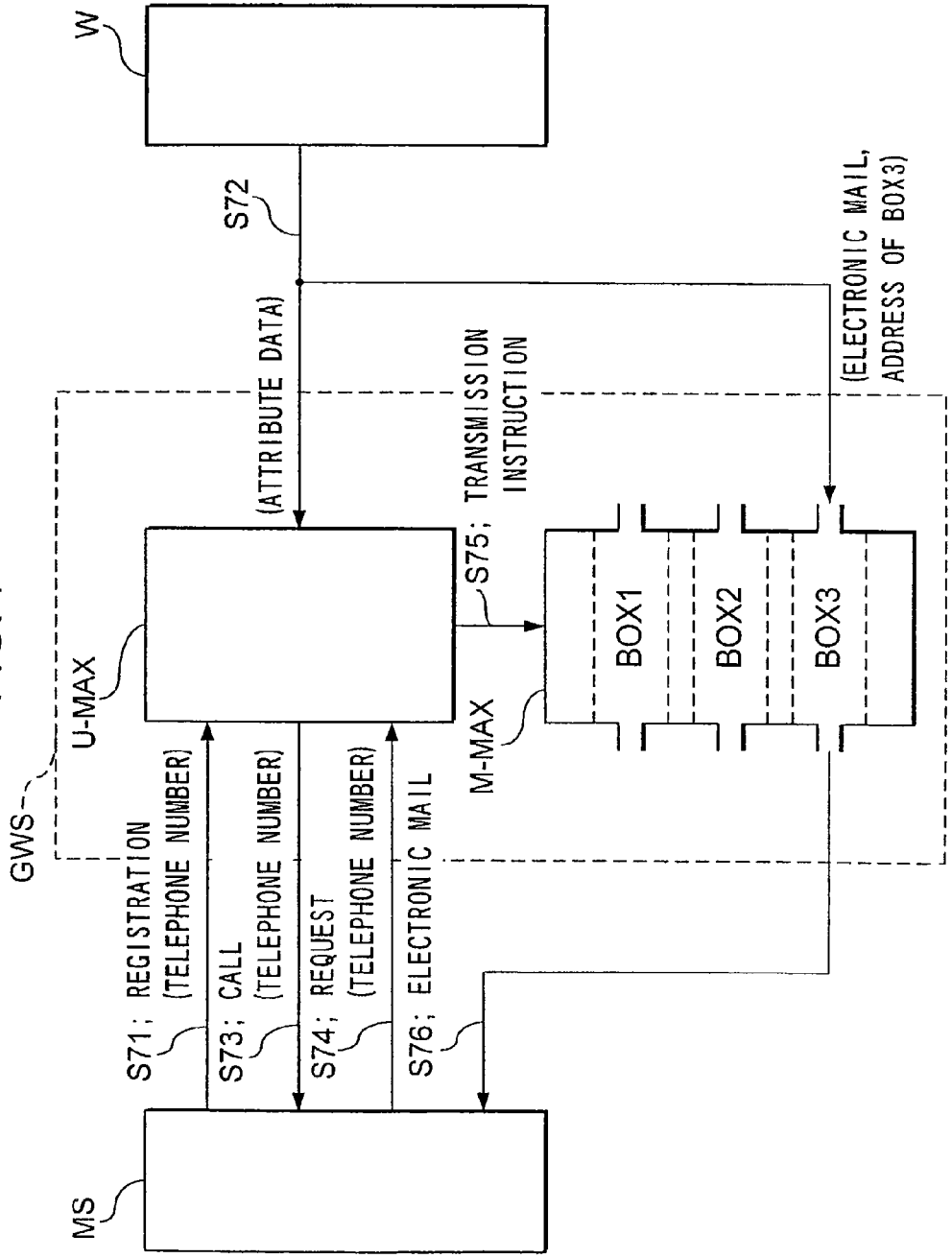
FIG. 7 is a conceptual diagram showing a second embodiment of the services according to the same push-type information transmission.

FIG. 7 is a conceptual diagram for explaining a second type. In the drawing, users who are prepared to receive services such as information provision from an unspecified IP operate the mobile station MS to access the network, and perform preliminary registration procedures with respect to the gateway server GWS (step S71). With this access, the telephone number of the mobile station MS is transferred to the gateway server GWS, and this is stored in the user information managing portion U-MAX of the gateway server GWS as user registration information.

Then, if the IP server W has information to be provided to users, the IP server W arranges the information in electronic mail form, appends attribute data such as sex, age and address for specifying the user to the electronic mail, and sends the mail to the gateway server GWS (step S72).

When the gateway server GWS receives the electronic mail containing the attribute data from the IP server W, it stores the electronic mail in the third mailbox BOX3, and in the user information managing portion U-MAX, compares the attribute data appended to the electronic mail with the attribute data of each user registered in the subscriber database UDB in order to specify relevant users. For example, if the attributes designated by the IP server W are "men in the thirties who live in Tokyo", then a search is made for relevant users having these attributes from among the users registered in the subscriber database UDB, and the telephone number of those users are extracted. The gateway server GWS calls the mobile stations MS of the telephone numbers extracted in this way (step S73).

If the user of a mobile station MS called in this way wishes to receive the information provided by the IP server, the user operates the mobile station MS to access the gateway server GWS, and requests a download of electronic mail (step S74). At this time, the telephone number of the mobile station MS which is the source of the request is appended to the download request signal sent to the gateway server GWS. The gateway server GWS, in the user information managing portion U-MAX, compares the telephone number of the mobile station MS from which the request signal is originated with the telephone numbers of users who have completed the above-described registration procedure in order to judge whether or not to permit access to the third mailbox BOX3, after which it reads the electronic mail from the third mailbox BOX3 and sends it to the mobile station MS which made the request (steps S75, S76).

In this way, it is possible for the IP server W to perform an information providing service to users who desire the provision of information from among users who are prepared to receive information from the unspecified IP server W.

B-2: Billing Procedure

While types of billing include communication fee billing for communication services and information fee billing for information providing services of IP's, communication fee billing shall be explained as an example in the present embodiment.

Additionally, the billing procedures for the present invention include user billing with respect to users who have been provided information and IP (Information Provider) billing for billing the IP's who have provided the information. In the present embodiment, whether to perform user billing or IP billing is managed by different methods for the case of pull-type information transmission and push-type information transmission. Both cases shall be explained below.

(1) In the Case of Pull-type Information Transmission

Generally, in the case of pull-type information transmission, the information is provided in accordance with a request from the user, so that user billing is more readily applicable. However, there are cases in which the IP wishes to provide information free in response to requests from unspecified users for the purposes of advertisement or the like, and in this case, IP billing is more readily applicable. Therefore, in the present embodiment, in the case of pull-type information transmission, user billing is applied in principle and in exceptional cases where IP billing is to be applied, the IP which is subject thereto is pre-registered in the subscriber database UDB. Then, the gateway server GWS extracts from the subscriber database UDB a list of URL's of IP servers W to which IP billing is to be applied, and stores it in a memory in the billing managing portion P-MAX as an IP-billing list table.

Figure 8:
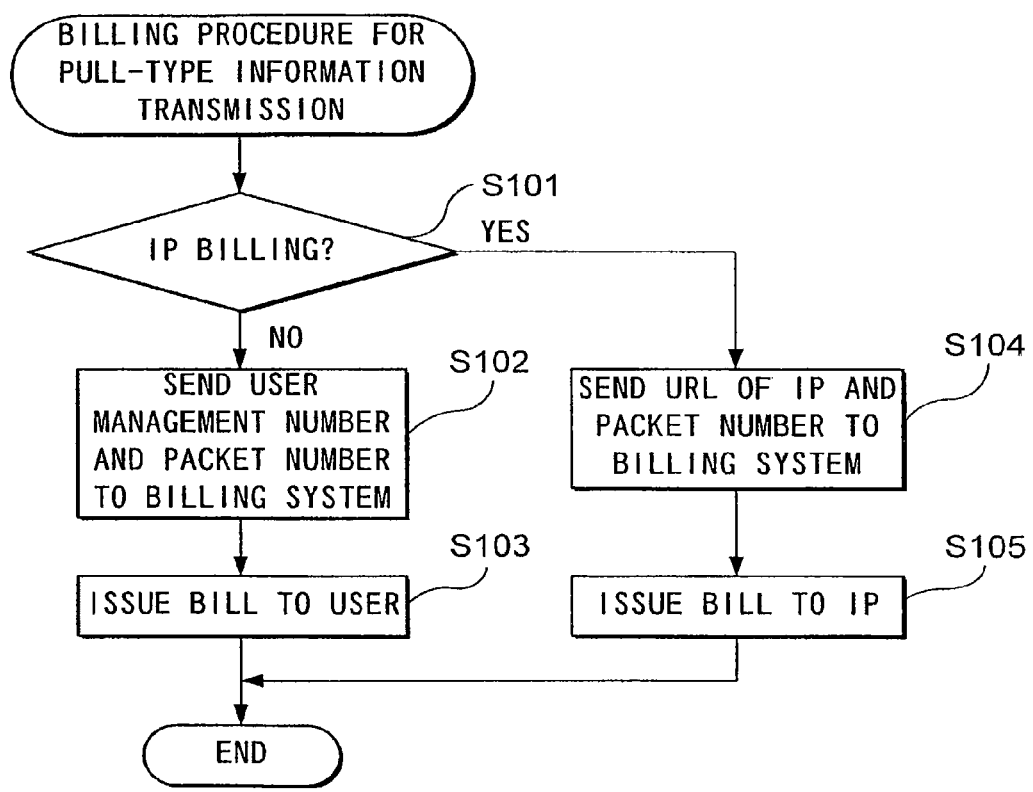
FIG. 8 is a flow chart showing a billing procedure for the case of the same pull-type information transmission.

FIG. 8 is a flow chart showing the billing procedure for pull-type information transmission. In this drawing, the user first operates the mobile station MS to access a designated IP server W, and upon receiving a delivery acknowledgement signal from the user, the gateway server GWS checks whether or not the URL of the IP server W accessed by the user corresponds to an IP to be IP billed as listed in the above-described table (step S101).

Here, if it is not an IP sever to be IP-billed, then user billing is applied as usual. In this case, the billing managing portion P-MAX of the gateway GWS sends a user management number of the user who received the information transmission and the sum of received packet numbers to the billing system BILL (step S102). The billing system BILL calculates a communication fee by multiplying the sum of packets supplied from the gateway server GWS with a unit price, and issues a bill to the user specified by the user management number (step S103).

On the other hand, if the URL of the IP server W accessed by the user corresponds to an IP to be IP-billed, then IP billing is applied. In this case, the billing managing portion P-MAX of the gateway server GWS sends the sum of the received packets and the URL of the IP server W which was accessed to the billing system BILL (step S104). The billing system BILL calculates the communication fee by multiplying the sum of packets supplied from the gateway server GWS with a unit price, and issues a bill to the IP (step S105).

(2) In the Case of Push-type Information Transmission

Next, the billing procedure for the case of push-type information transmission shall be described. FIG. 9 is a flow chart showing a billing procedure for the case of push-type information transmission. In the drawing, when the gateway server GWS receives electronic mail from the IP server W in the second mailbox BOX2 or the third mailbox BOX3, it recognizes that there has been an order for push-type information transmission, and decides to apply IP billing (step S201). That is, in the case of push-type information transmission, IP billing is more readily applicable to this type of information transmission, so that in the present embodiment, IP billing is always applied.

Next, the gateway server GWS specifies the user to which information is to be provided as described above, then calls the mobile station MS to transmit the electronic mail received from the IP server to the mobile station MS, but in the case of IP billing, user billing is not performed with respect to this transmission, and the IP is billed for everything.

In this case, the billing managing portion P-MAX of the gateway server GWS references the IP registration information stored in the subscriber database UDB, and checks whether the type of billing to be applied to the IP server W is amount-dependent or fixed-rate (step S202).

If the billing type is amount-dependent, the billing managing portion P-MAX of the gateway server GWS sends the sum of the packets exchanged in the transmission of electronic mail and the URL of the IP server W which was the source of the electronic mail to the billing system BILL (step S203). The billing system BILL multiplies the sum of the packets supplied from the gateway server GWS with a unit price to calculate the communication fee, and issues a bill to the IP (step S204).

On the other hand, if the billing type is fixed-rate, then the billing managing portion P-MAX of the gateway server GWS sends the URL of the IP server W to the billing system BILL at the same time as the electronic mail is received from the IP server, so as to order billing to that IP (step S205). The billing system BILL receives this and issues a bill of a standard amount to the indicated IP (step S206).

If the fixed-rate billing format is one where billing is applied to a standard period of time such as by monthly units, the IP is billed whether or not the electronic mail from the IP server W reaches the gateway server GWS. Therefore, in this case, there is no cooperation between the gateway server GWS and the billing system BILL, and the billing system BILL independently issues a bill to the IP at regular periods.

C: Modification Examples

As previously mentioned, the present invention is not restricted to the above-described embodiments. The present invention can have various modifications within the range of the technical concept of the present invention, for example the following.

(1) In the embodiments, information is provided to mobile stations MS belonging to a mobile packet communication network MPN from another network such as the Internet INET (first communication network), but if for example there exists another global network which can replace the Internet INET, then the present invention is applicable to cases wherein information is provided from such a network to a mobile station MS belonging to a mobile packet communication network MPN. In this case, the information resource of the IP server W can be specified by means of an absolute address defined in the global network to which it is applied, instead of by a URL.

Additionally, the network (second communication network) to which the user terminal belongs is not restricted to being a mobile packet communication network MPN, and the invention is applicable for providing information to user terminals belonging to local networks such as fixed network which includes stationary terminals.

Furthermore, the present invention is not restricted to packet switching networks, and is applicable to data communication networks which perform other types of data communications, and the communication protocols indicated in the embodiments represent only one possible example. Additionally, the form of the data transmitted from the IP server is not restricted to HTML format, and other formats may be employed. For example, if the transmitted information is only text data, then it is of course not necessary to employ a data format such as HTML which can handle multimedia.

(2) In the embodiments, the communication fee billing for pull-type information transmission was uniformly made amount-dependent, but the present invention is not limited thereto, so that it is possible to register information indicating whether amount-dependent or fixed-rate in the subscriber database UDB as in the case of push-type information transmission, and to perform billing procedures in accordance with the type of billing. In the case that a fixed-rate system is employed for pull-type information transmission, the user or IP is billed a standard amount regardless of the number of exchanged packets, as in the case of push-type information transmission.

Additionally, while the billing type was set for each IP in the IP registration file of the subscriber database UDB in the embodiments, the present invention is not restricted thereto, and it is possible to set for each user in the subscriber registration file. Additionally, when wishing to set the billing type according to the IP and the user, then the billing type for each user can be set for each IP in the IP registration information file, or the billing type for each IP can be set for each user in the subscriber registration information file.

(3) While only communication fee billing was explained in the embodiments for the purpose of retaining simplicity, the present invention can be similarly applied to information fee billing. However, when employing amount-dependent information fee billing, billing does not depend on the number of exchanged packets as in communication fee billing, but it is possible to apply various billing types such as for example, billing in accordance with the number of exchanged electronic mails or when wishing to change the amount depending on the case, appending amount information concerning a mail transmission to the electronic mail sent from the IP server W to send to the gateway server GWS.

Additionally, in the case of information fee billing, it is possible to perform only user billing and to not perform IP billing. In this case, all of the billing types in the IP registration information file in the subscriber database UDB can be set to user billing or the billing procedure can be not performed with respect to IP's which are set for IP billing.

(4) In the embodiments, the billing type in pull-type information transmission was decided by the gateway server GWS having a list table of IP-billing and referencing the table, but the present invention is not restricted thereto, and it is possible for example to append information indicating whether IP billing or not by adding a tag to the HTML data sent from the IP server W, and to have the gateway server GWS decide the billing type based on this information.

(5) The structure of the network in the embodiments is no more than one possible example, and the present invention is not restricted to such a structure. For example, it is possible to divide up the functions among a plurality of nodes such as by arranging into divisions of nodes having a communication protocol converting function and nodes having other functions.

(6) In the embodiments, the IP server W manages user registration information with respect to the IP's in a first type of service by means of push-type information transmission, but the present invention may be such that the gateway server GWS handles the management of user registration information. For example, as shown in FIG. 10, among the dialog screens displayed when a user performs registration procedures with the IP, it is possible to send and display only a dialog screen (hereafter referred to as a registration screen) for aiding in the registration operation as HTML data prepared by the gateway server GWS to the mobile station MS of the user, then store and manage the user registration information at the gateway server GWS based on the user registration procedures. In this case, it is possible for the gateway server GWS to find which IP server W the user has performed registration procedures, based on the address information such as the URL designated when the user accesses the IP server W. Therefore, if the gateway server GWS has HTML data for providing a registration screen with respect to a plurality of IP servers W in correspondence to the address information such as the URL, then it is possible to specify the HTML data to be sent to the mobile station MS of the user as a registration screen based on the address information such as the URL designated by the user.

(7) While in the embodiments, in the case of push-type information transmission, the user of a mobile station MS who has received a call for electronic mail operates the mobile station MS to access the gateway server GWS and download the electronic mail, but the present invention is not restricted thereto, and it is possible to make the process such that when the mobile station MS receives a call, it automatically accesses the gateway server GWS and downloads the electronic mail without waiting for the instruction operations of the user.

(8) In the embodiments, IP billing is always used for push-type information transmission, but the present invention is not restricted thereto, and user billing can also be applied in the case of push-type information transmission. In this case, as with the pull-type information transmission described above, an IP billing list table should be made based on the set contents of a subscriber database UDB, this table should be referenced in order to determine whether to use IP billing or user billing, and in the case of user billing, the procedures appropriate for user billing should be followed.

Additionally, even in the case of exclusively IP billing, it is possible to prepare an IP billing list table for having a list of relevant IP servers to be IP-billed, so that when there is a request for push-type information transmission from an IP server not listed in this table, the information transmission will not be routed such as by disposing of the sent electronic mail.

What is claimed is:

1. A transfer device for routing information in a communication network between at least one information provider server and a plurality of user terminals which receive information from the information provider server, the transfer device comprising at least one computer and at least one memory which stores programs executable by the at least one computer to:
 record information provider server identification information for billing procedure in the at least one memory;
 after recording the information provider server identification information, receive push-type information from the information provider server and route at least a part of the received push-type information to a user terminal;

determine, based on the recorded information provider server identification information, which party to bill for receiving the push-type information by the user terminal, either an information provider of the information provider server or a user of the user terminal; and at least partly bill the party determined to be billed.

2. The transfer device of claim 1, wherein the information provider server identification information comprises a network address of the information provider server.

3. The transfer device of claim 1, wherein the at least one computer bills the information provider server.

4. The transfer device of claim 1, wherein the plurality of user terminals is in a first communication network following a first communication protocol, and the information provider server is in a second communication network following a second communication protocol, and wherein the transfer device is a gateway server converting between the first and second communication protocols.

5. The transfer device of claim 4, wherein the first communication network comprises a mobile communication network, and the second communication network comprises an Internet, and wherein the plurality of user terminals comprise mobile terminals.

6. An information routing method performed by a transfer device, the transfer device comprising at least one computer and at least one memory for routing information in a communication network between at least one information provider server and a plurality of user terminals which receive information from the information provider server, the method comprising computer-executable steps executable by the at least one computer to implement:

recording information provider server identification information for billing procedure in the at least one memory;

after recoding the information provider server identification information, receiving push-type information from the information provider server and routing at least a part of the received push-type information to a user terminal;

determining which party to bill for receiving the push-type information by the user terminal, either an information provider of the information provider server or a user of the user terminal, based on the recorded information provider server identification information; and at least partly billing the party determined to be billed.

7. The method of claim 6, wherein the information provider server identification information comprises a network address of the information provider server.

8. The method of claim 6, wherein the at least one computer bills the information provider server.

9. The billing method of claim 6, wherein the plurality of user terminals is in a first communication network following a first communication protocol, and the information provider server is in a second communication network following a second communication protocol, wherein the transfer device is a gateway server converting between the first and second communication protocols.

10. The billing method of claim 9, wherein the first communication network comprises a mobile communication network, and the second communication network comprises an Internet, and wherein the plurality of user terminals comprise mobile terminals.

11. A transfer device for routing pull-type information in a communication network between at least one information provider and a plurality of user terminals which receive information from the information provider server, the transfer device comprising at least one computer and at least one memory which stores programs executable by the at least one computer to:

receive a request for pull-type information from a user terminal;

send the request to an information provider server;

receive, from the information provider server in response to the request to the information provider server, the pull-type information and billing information other than a network address, the billing information being associated with the pull-type information;

route at least a part of the received pull-type information to the user terminal;

determine, based on the billing information received from the information provider server, which party to bill for receiving the pull-type information by the user terminal, either an information provider of the information provider server or a user of the user terminal; and at least partly bill the party determined to be billed, wherein the communication comprises HTML data, and the billing information comprises a tag associated with the HTML data.

12. A transfer device for routing pull-type information in a communication network between at least one information provider and a plurality of user terminals which receive information from the information provider server, the transfer device comprising at least one computer and at least one memory which stores programs executable by the at least one computer to:

record information provider server identification information for billing procedure in the at least one memory;

after recoding the information provider server identification information, receive a request for pull-type information from a user terminal;

send the request to an information provider server;

receive the pull-type information from the information provider server in response to the request to the information provider server;

route at least a part of the received pull-type information to the user terminal;

determine, based on the recorded information provider server identification information, which party to bill for receiving the pull-type information by the user terminal, either an information provider of the information provider server or a user of the user terminal; and at least partly bill the party determined to be billed.

13. The transfer device of claim 12, wherein the information provider server identification information comprises a network address of the information provider server.

14. An information routing method performed by a transfer device, the transfer device comprising at least one computer and at least one memory for routing pull-type information in a communication network between at least one information provider server and a plurality of user terminals which receive information from the information provider server, the method comprising computer-executable steps executable by the at least one computer to implement:

receiving a request for pull-type information from a user terminal;

sending the request to an information provider server;

receiving, from the information provider server in response to the request to the information provider server, the pull-type information and billing information other than a network address, the billing information being associated with the pull-type information;

routing at least a part of the pull-type information to the user terminal;

determining which party to bill for receiving the information by the user terminal, based on the billing information received from the information provider server, either an information provider of the information provider server or a user of the user terminal; and at least partly billing the party determined to be billed, wherein the communication comprises HTML data, and the billing information comprises a tag associated with the HTML data.

15. An information routing method performed by a transfer device, the transfer device comprising at least one computer and at least one memory for routing pull-type information in a communication network between at least one information provider server and a plurality of user terminals which receive information from the information provider server, the method comprising computer-executable steps executable by the at least one computer to implement:

recording information provider server identification information for billing procedure in the at least one memory;

after recording the information provider server identification information, receiving a request for pull-type information from a user terminal;

sending the request to an information provider server;

receiving the pull-type information from the information provider server in response to the request to the information provider server;

routing at least a part of the pull-type information to the user terminal;

determining which party to bill for receiving the information by the user terminal, based on the recorded information provider server identification information, either an information provider of the information provider server or a user of the user terminal; and at least partly billing the party determined to be billed.

16. The billing method of claim 15, wherein the information provider server identification information comprises a network address of the information provider server.

17. An information transmission management method in a communication network comprising at least one information provider server, a plurality of user terminals for receiving information provided by the information provider server, and an information transmission management system, the information transmission management system comprising at least one computer and at least one memory for managing transmission of information between the information provider server and the user terminals, the method comprising computer-executable steps performed by the at least one computer of the information transmission management to implement:

registering, in the at least one memory, the information provider server with the information transmission management system, along with billing information regarding an information transmission service rendered by the information provider server;

registering, in the at least one memory, at least one user terminal with the information transmission management system, along with user information regarding a user of the at least one user terminal who receives the information transmission service from the information provider server;

after registering the information provider server and the at least one user terminal with the information transmission management system, receiving from the information provider server information provided for the user under the information transmission service;

determining which party to bill a fee related to the user receiving the information transmission service from the information provider server, either the user or an information provider of the information provider server, based on at least one of the registered billing information and the registered user information; and billing the party determined to be billed.

18. The method of claim 17, wherein billing the party determined to be billed comprises billing the party, based on a fixed rate.

19. The method of claim 18, wherein billing the party based on the fixed rate comprises billing the party regardless of whether information is routed to the user terminal.

20. The method of claim 19, wherein the information transmission management system periodically bills the party, independent of whether information is transmitted to the user terminal.

21. The method of claim 17, wherein the information transmission management system communicates with the plurality of user terminals via a first network and with the information provider server via a second network.

22. The method of claim 21, wherein the second network comprises an Internet;

wherein the first network comprises a mobile communication network with the information transmission management system communicating with the plurality of user terminals via at least the mobile communication network; and wherein the plurality of user terminals comprise mobile terminals.

23. An information transmission management system, the information transmission management system managing transmission of information between a plurality of user terminals in a first network and an information provider server in a second network, the information transmission management system comprising:

at least one database comprising registration of billing information regarding an information transmission service rendered by the information provider server and user information regarding a user of at least one user terminal who receives the information transmission service from the information provider server;

a gateway server configured to, after the billing information and the user information are registered in the at least one database, receive from the information provider server information provided for the user under the information transmission service, wherein the gateway server determines which party to bill a fee related to the user receiving the information transmission service from the information provider server, either the user or an information provider of the information provider server, based on at least one of the registered billing information and the registered user information; and billing system in communication with the at least one database to calculate and bill the fee to a party determined to be billed.

24. The information transmission management system of claim 23, wherein the billing system bills the party determined to be billed, based on a fixed rate.

25. The information transmission management system of claim 24, wherein the billing system bills the user regardless of whether information is routed to the user terminal.

26. The information transmission management system of claim 25, wherein the billing system periodically bills the user independent of whether information is routed to the user terminal.

27. The information transmission management system of claim 23, wherein the second network comprises an Internet;

wherein the first network comprises a mobile communication network with the information transmission management system communicating with the plurality of user terminals via at least the mobile communication network; and wherein the plurality of user terminals comprise mobile terminals.

* * * * *